United States Patent
Yamato

(10) Patent No.: US 9,794,880 B1
(45) Date of Patent: Oct. 17, 2017

(54) COMMUNICATION DEVICE AND COMMUNICATION METHOD

(71) Applicant: KABUSHIKI KAISHA TOSHIBA, Tokyo (JP)

(72) Inventor: Katsumi Yamato, Chiba Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/438,689

(22) Filed: Feb. 21, 2017

(30) Foreign Application Priority Data

Sep. 12, 2016 (JP) ................. 2016-177571

(51) Int. Cl.
*H04W 52/02* (2009.01)
*H04W 4/00* (2009.01)
*H04W 76/02* (2009.01)

(52) U.S. Cl.
CPC ....... *H04W 52/0216* (2013.01); *H04W 4/008* (2013.01); *H04W 76/023* (2013.01)

(58) Field of Classification Search
CPC ............. H04W 52/0216; H04W 4/008; H04W 76/023; H04W 52/0229; H04W 68/02; H04W 84/20; H04W 8/005; H04W 48/02; H04W 8/00; Y02B 60/50; H04B 7/00
See application file for complete search history.

(56) References Cited

U.S. PATENT DOCUMENTS

| 7,519,039 | B2 | 4/2009 | Carter et al. | |
| 7,924,795 | B2* | 4/2011 | Wan | H04W 72/1215 370/338 |
| 8,223,693 | B2* | 7/2012 | Ko | H04W 52/281 370/328 |
| 8,744,356 | B2* | 6/2014 | Ko | H04W 84/12 455/41.2 |
| 9,414,217 | B2* | 8/2016 | Knaappila | H04W 8/005 |
| 9,479,892 | B2* | 10/2016 | Knaappila | H04W 4/008 |
| 2013/0003630 | A1 | 1/2013 | Xhafa et al. | |

FOREIGN PATENT DOCUMENTS

| JP | 2008167149 A | 7/2008 |
| JP | 5058264 B2 | 10/2012 |
| JP | 2014-518492 A | 7/2014 |

* cited by examiner

*Primary Examiner* — Pablo Tran
(74) *Attorney, Agent, or Firm* — Patterson & Sheridan, LLP

(57) ABSTRACT

According to one embodiment, a first communication device performing wireless communication with second and third communication devices is provided. The first communication device includes a communication control unit that determines a time period during which communication between the first and second communication devices could interfere with a communication between the first and third communication devices, sets the beginning of a time period during which communication between the first and the third communication devices can occur as a time where the transmission or receipt of a communication between the first and third communication devices will not interfere with a communication between the first and second communication devices, and transmits a coupling request signal including information concerning the time until the beginning of the time period during which communication between the first and third communication devices begins so as to establish communication with the second communication device.

20 Claims, 7 Drawing Sheets

COMMUNICATION DEVICE AND COMMUNICATION METHOD

CROSS-REFERENCE TO RELATED APPLICATION

This application is based upon and claims the benefit of priority from Japanese Patent Application No. 2016-177571, filed Sep. 12, 2016, the entire contents of which are incorporated herein by reference.

FIELD

Embodiments described herein relate generally to a communication device and a communication method.

BACKGROUND

Recently, in addition to communication performed among a plurality of predetermined apparatuses, communication by freely establishing communication connections between digital apparatuses which are close to each other and transmitting information to and receiving information from arbitrary nearby apparatuses is widely performed.

There is a communication connection establishing method which is performed according to, for example, a Bluetooth(®) smart (popular name, Bluetooth Low Energy: referred to as BLE hereinafter) standard.

However, if a master apparatus establishes a new communication connection with other communication apparatuses in addition to a communication connection which has been already established, agreement or the like on a communication start position between the apparatuses is not defined in, for example, the specification of a BLE standard.

Accordingly, there is a problem that, when a communication connection of a master apparatus with a plurality of slave apparatuses is established, the number of stops and starts of power supply for power saving in the communication apparatuses increases.

DETAILED DESCRIPTION

Embodiments provide a communication device and a communication method which establish communication connections with a plurality of communication apparatuses so as to reduce the number of stop and start of power supply for reducing power consumption.

In general, according to one embodiment, a first communication device that performs wireless communication with at least a second communication device and a third communication device includes a communication control unit that, when the first communication device is in communication with the second communication device, and receives a request to communicate with the third communication device from the third communication device, determines the time period during which communication between the first communication device and the second communication device can occur, calculates a time period when a communication between the first communication device and the second communication device could interfere with a communication between the first communication device and the third communication device, sets, as the beginning of a time period during which communication between the first communication device and the third communication device can occur, a time where the transmission or receipt of a communication between the first communication device and the third communication device will not interfere with a communication between the first communication device and the second communication device, and transmits a coupling request signal including information concerning the time until the beginning of the time period during which communication between the first communication device and the third communication device begins so as to establish communication with the second communication device. Hereinafter, embodiments will be described with reference to drawings.

Configuration

Figure 1:
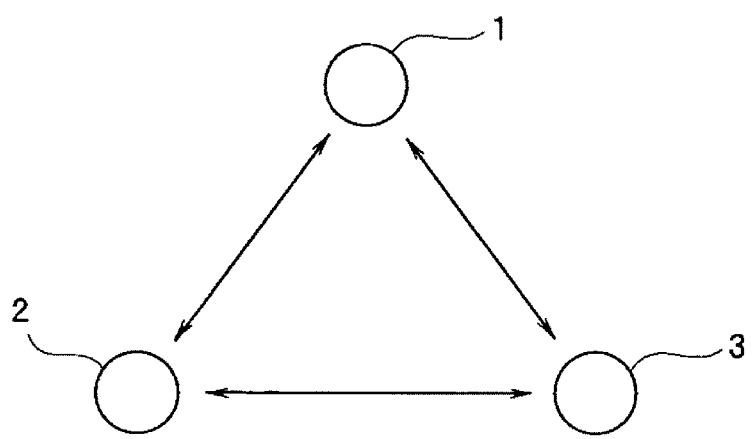
FIG. 1 is a conceptual diagram of a wireless communication system according to the present embodiment.

FIG. 1 is a conceptual diagram of a wireless communication system according to the present embodiment. In the present embodiment, a plurality of (three in FIG. 1) communication apparatuses 1, 2, and 3 included in the wireless communication system can communicate with each other by using a communication protocol of a BLE standard.

Figure 2A:
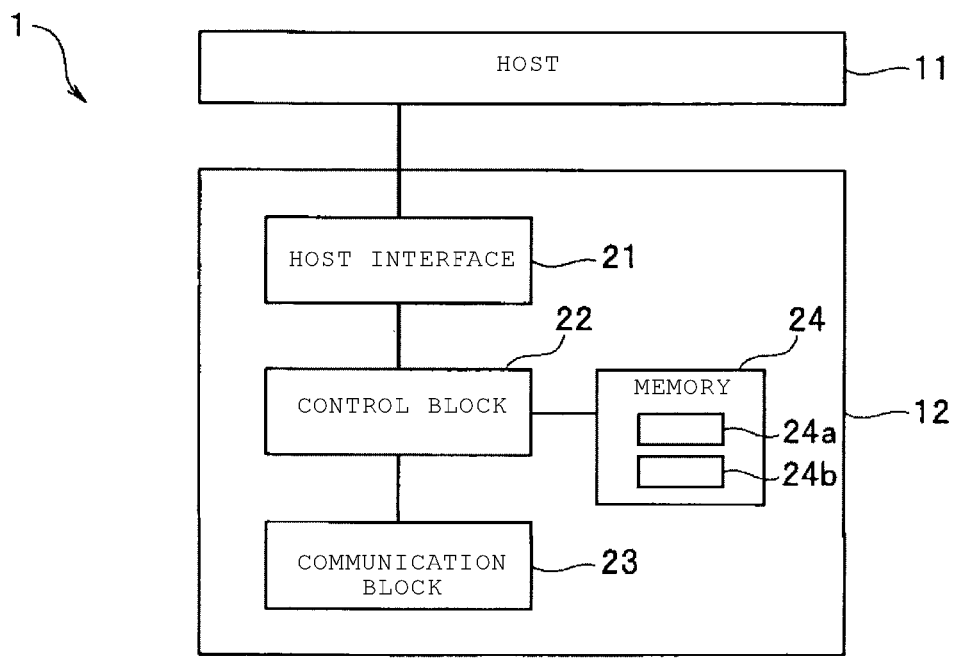
FIG. 2A is a block diagram illustrating a configuration of each communication apparatus according to the present embodiment.

FIG. 2A is a block diagram illustrating a configuration of each communication apparatus. FIG. 2A illustrates a configuration of the communication apparatus 1, and the communication apparatuses 2 and 3 also have the same configuration as the communication apparatus 1.

The communication apparatus 1 includes a host 11 and a communication device 12. The host 11 is an apparatus, such as a notebook personal computer (hereinafter, referred to as a PC), a smart phone, or an LSI itself that is a microcomputer. The communication device 12 is connected to a control unit of a microcomputer or the like of the host 11. The communication device 12 is a semiconductor device for wireless communication which is connected to or mounted in the host 11. The communication apparatuses 1, 2, and 3 of a PC or the like can communicate with each other using a communication protocol of a BLE standard through each communication device 12.

In the BLE standard, a plurality of frequency channels are defined within a predetermined frequency bandwidth, and wireless communication is performed by using a frequency hopping method.

The frequency hopping method is a spread spectrum method, and is a method of changing the frequency of a signal which is transmitted for an extremely short time (approximately 0.1 seconds in many cases).

The communication device 12 includes a host interface 21, a control block 22, a communication block 23, and a memory 24.

The host interface 21 is an interface circuit for performing transmission and reception of data between the host 11 that is a PC or the like and the control block 22.

The control block 22 which performs communication control includes a central processing unit (hereinafter, referred to as a CPU), and is a control circuit which controls an operation of the communication device 12.

The communication block 23 includes an antenna and a wireless communication circuit. The communication block 23 includes a physical layer and a MAC layer.

The memory 24 is a storage device which includes a ROM, a RAM, a flash memory, or the like. The memory 24 stores various programs including a power saving control program 24a which will be described below and a communication connection establishment processing program 24b which will be described below.

The physical layer is a first layer in a reference model of the international organization for standardization (ISO), and defines electrical, mechanical, functional, and procedural means which establish, maintain, and release physical connections for performing 1473642139786_2 transmission on a transmission medium (1473642139786_0 or 1473642139786_1).

The MAC layer is a second layer in a reference model of the international organization for standardization (ISO), and requests service for a physical layer of a lower layer in response to service request from a network layer of an upper layer.

As a CPU of the control block 22 reads various programs. which will be described below, from the memory 24 and executes the programs, functions of each program are achieved.

The communication apparatus 1 in FIG. 2A has a configuration in which the host 11 performs communication control and the communication device 12 performs communication, but the communication apparatus 1 may perform communication control by installing a communication program into the communication device 12 and executing a communication control program thereof without including the host 11.

Figure 2B:
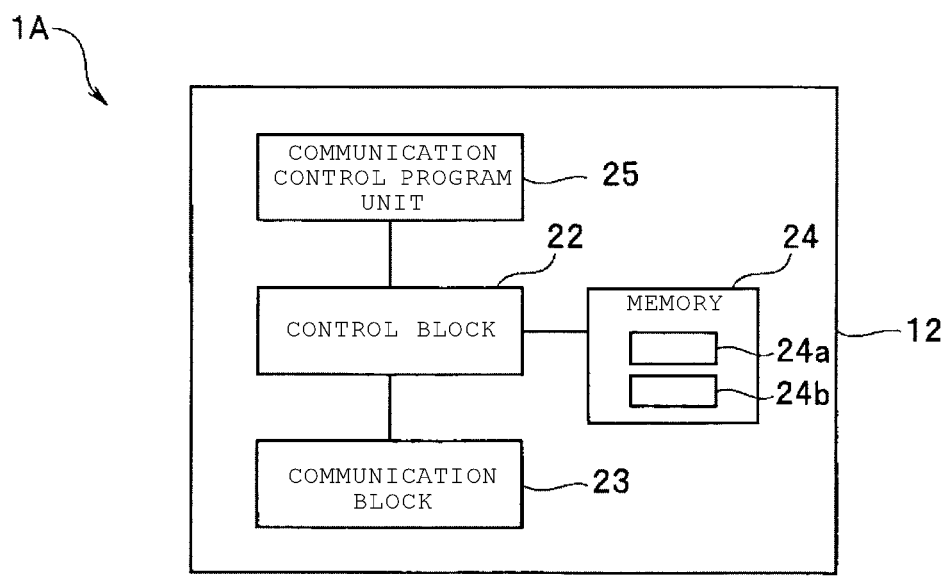
FIG. 2B is a block diagram illustrating a configuration of a modification example of the communication apparatus according to the present embodiment.

FIG. 2B is a block diagram illustrating a configuration of a modification example of the communication apparatus. FIG. 2B illustrates a configuration of a communication apparatus 1A according to the modification example that has approximately the same configuration as the communication apparatus 1 illustrated in FIG. 2A, wherein a communication device 12 includes a communication control program unit 25 which is a storage unit that stores a communication control program for performing communication control instead of using the host interface 21.

That is, the communication apparatus 1A in FIG. 2B is a semiconductor chip module in which the communication device 12 itself includes a communication control unit, and does not include the host 11.

Communication operations of each communication apparatus which will be described below are performed, as a CPU of the control block 22 reads a necessary communication control program from the memory 24 and executes the program, in accordance with a state or a mode of the communication apparatus.

The communication devices 12 of the communication apparatuses 1, 2 and 3 can wirelessly communicate with each other at a predetermined interval, if communication connections with the other communication devices of other ones of communication apparatuses 1, 2 and 3 are established.

Operation

Initially, the sequence in which a communication connection between the communication apparatus 1 and the communication apparatus 2 is established will be described. Communication between the communication apparatuses 1, 2, and 3 is performed by the communication device 12 of each communication apparatus.

Figure 3:
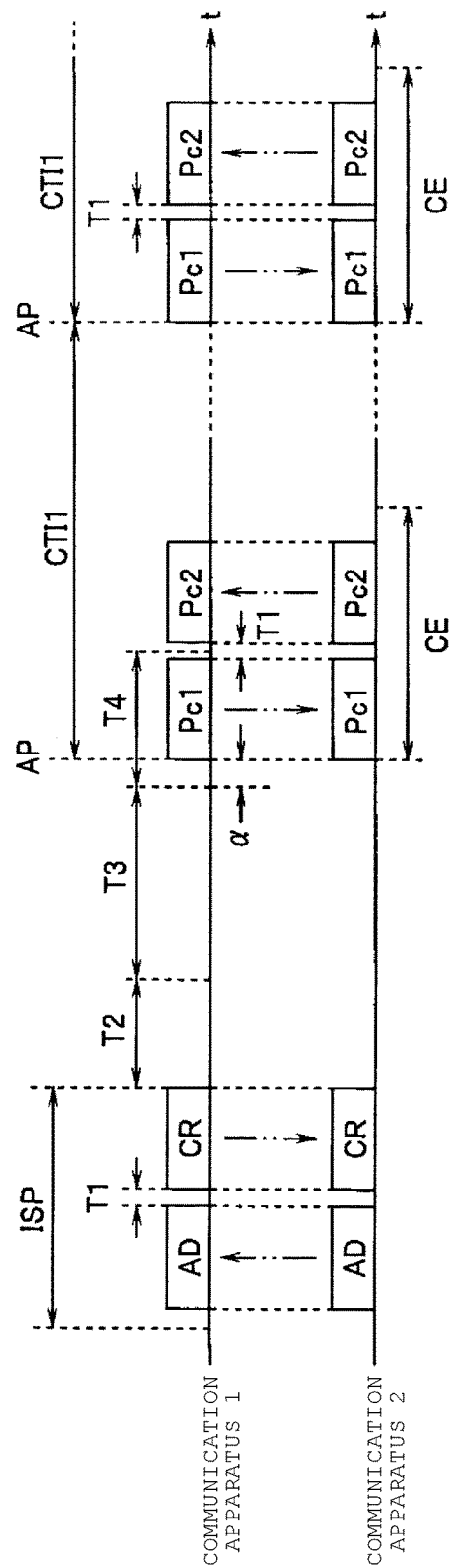
FIG. 3 is a timing chart illustrating transmission and reception of data for establishing a communication connection between two communication apparatuses according to the present embodiment.

FIG. 3 is a timing chart illustrating transmission and reception of data for establishing a communication connection between two communication apparatuses. FIG. 3 illustrates a method of establishing a communication connection according to the BLE standard between the communication apparatuses 1 and 2.

In the BLE standard, the communication apparatus which is a master enters an initiating state and thereafter, continuously awaits reception of advertising packets which are transmitted from other communication apparatuses.

Here, in the Piconet, a communication apparatus which transmits a packet that starts communication processing is a master, and a communication apparatus which transmits a packet in synchronization with the packet that is transmitted from the master is a slave.

Then, when a communication apparatus which becomes the master receives the advertising packet transmitted from a desired communication apparatus, the communication apparatus transmits a coupling request packet in which subsequent communication connection information is described, thereby being able to establish a communication connection with the communication apparatus as the master. The communication apparatus which has transmitted the coupling request packet can communicate with the master as the slave. The communication apparatus in operation as the master can also establish a communication connection with a new communication apparatus.

In addition, in order to reduce power consumption after communication ends, each communication apparatus has a power saving function of stops the power supply to a partial communication circuit including the physical layer.

The communication device 12 may be in various states in which scan processing, initiation processing, advertisement processing, and the like are performed, in accordance with instruction from the host 11.

When each communication device 12 becomes the master in accordance with the instruction from the host 11, the communication device enters an initiating state in which initiation processing is periodically performed. In the initiating state, whether or not the advertising packet AD is received is determined during only a predetermined initiating state period ISP. When communication is allowed, a coupling request packet CR which is a coupling request signal can be transmitted.

In the advertising state, with respect to a communication apparatus which is not synchronized (that is, communication connection is not established), the advertisement processing which transmits a packet and waits for a response from the communication apparatus, if necessary, is periodically performed.

A packet which is transmitted in the advertisement processing is referred to as an advertising packet AD, and a time period in which the advertisement processing is performed is referred to as advertising event.

In addition, each communication device 12 enters the advertising state in which advertisement processing is performed in accordance with a setting from the host 11. Each communication device 12 transmits the advertising packet AD as a broadcast signal at the time of an advertising event which occurs in a predetermined cycle in accordance with the instruction from the host 11.

That is, the advertising packet AD is a predetermined signal defined by the BLE standard. The control block 22 of the communication device 12 performs the initiation processing for receiving the advertising packet AD in a predetermined cycle.

In FIG. 3, if the communication apparatus 1 which enters the initiating state receives the advertising packet AD from the communication apparatus 2 which desires communication connection establishment and is in the middle of entering the advertising state, the communication apparatus 1 returns the coupling request packet CR after a predetermined period T1, here, 0.15 ms (milliseconds) after the reception period of the advertising packet AD ends. In FIG. 3, the advertising packet AD is received during the initiating state period ISP of the communication apparatus 1.

The coupling request packet CR is a packet signal which includes information of various timings or the like for mutual communication and is for notification from the master to the slave. Specifically, the coupling request packet CR includes information of predetermined periods T3 and T4 and information of a coupling interval CTI1 as parameters.

The predetermined period T3 is a time period which is an integer multiple of a predetermined time period T2 (1.25 ms) subsequent to transmitting the coupling request packet CR. The predetermined period T4 is a time period which is an integer multiple of the predetermined period T2 (1.25 ms). A coupling interval CTI is also a time period which is an integer multiple of the predetermined period T2 (1.25 ms).

As the coupling request packet CR is returned, the communication apparatus 1 determines that a communication connection is established between the communication apparatuses 1 and 2, and enters, from the initiating state, an operation state as the master.

In addition, as the coupling request packet CR is returned, the communication apparatus 2 also determines that the communication connection is established between the communication apparatuses 1 and 2, and enters, from the advertising state, an operation state as a slave.

The communication apparatus 1, which operates as the master, transmits a packet at a certain timing within the predetermined period T4, after the predetermined periods T2 and T3 have elapsed since the coupling request packet CR was transmitted.

Here, the predetermined period T2 is 1.25 ms, which is a fixed value determined by the BLE standard. The predetermined period T3 is a transmission window offset (transmitWindowOffset) period. The predetermined period T4 is a transmission window (transmitWindow) period.

A transmission window means a time period during which a packet can be transmitted for the first time after the coupling request packet CR is transmitted.

Transmission window offset defines a time period between transmission time of the coupling request packet CR and the transmission window start time. After transmission of the coupling request packet CR is completed, time to which the transmission window offset+1.25 ms is added becomes the transmission window start time.

The communication apparatus 2 performs reception of a first packet from the communication apparatus 1, and transmission of the first packet to the communication apparatus 1, based on values of the predetermined periods T3, T4, and CTI which are included in the received coupling request packet CR. That is, the values of the predetermined periods T3, T4, and CTI are defined by the communication apparatus 1 and are written into packets of the coupling request packet CR which is transmitted. As described above, the communication apparatus 1 transmits the coupling request packet CR in which values of the predetermined periods T3, T4, and CTI have been written to the communication apparatus 2.

In FIG. 3, time α is added to the predetermined period T4 at which transmission and reception of a first packet Pc1, that is a polling signal, are begun after the predetermined period T3 elapses. The time α is a margin time for ensuring reception of the first packet Pc1.

If the coupling request packet CR is received, the communication apparatus 2 sets the reception time window for receiving a first packet which is transmitted from the communication apparatus 1 to the predetermined period T4, based on information of the predetermined periods T3 and T4, and enters a state where the first packet Pc1 can be received from the communication apparatus 1.

The communication apparatus 2 which operates as the slave returns a packet Pc2 after the elapse of a predetermined period T1 (0.15 ms) seconds after reception of the first packet Pc1 has been completed, if the first packet Pc1 is received during the predetermined period T4 which is the afore-mentioned reception window period.

Thereafter, the communication apparatus 1 and the communication apparatus 2 can communicate with each other during the connection event which occurs in each thereof at an interval of the coupling interval CTI1. That is, wireless communication is performed at the coupling interval CTI which is a predetermined interval, between the communication apparatus 1 and the communication apparatus 2 which complete establishment of the communication connection.

Transmission start time of the first packet Pc1 which is transmitted from the communication apparatus 1 is set as a communication start position (Anchor Point) AP of the communication connection. The communication start position AP is set at each coupling interval (connInterval) CTI. The communication apparatus 1 and the communication apparatus 2 are allowed to perform packet communication from the communication start position AP, as long as the apparatuses have transmission data to share with a partner communication apparatus.

Communication between the communication apparatus 1 which is the master and the communication apparatus 2 which is the slave is performed in each connection event, and a time length (hereinafter, referred to as a connection event length) CE of the connection event is defined by the master. Hence, the communication apparatus 2 which is the slave is allowed to communicate with the master during a period of the connection event length CE, once communication start time is reached.

A communication device of the communication apparatus which is the master sets a time length of the connection event for communication processing at each interval in which communication with each of the communication apparatuses which are the slaves is performed, that is, at each coupling interval.

As the above description, the sequence of establishing the communication connection in the communication which is performed one to one in the wireless communication system is described. The slave can receive a first packet from the master during a reception window period determined by the master, and thereafter, receives a polling signal from the master at timing based on the coupling interval CTI determined by the master, and the slave can performs transmission and reception of data.

Next, power saving control processing will be described. The communication device 12 has a function for saving power. A power saving control program 24a is stored in the memory 24, and is read by a CPU of the control block 22, thereby being executed. Hence, when wireless communication is not performed for predetermined time tTH or more, the CPU and the power saving control program 24a together configure a power supply control unit which stops supplying power to the circuit for wireless communication.

Figure 4:
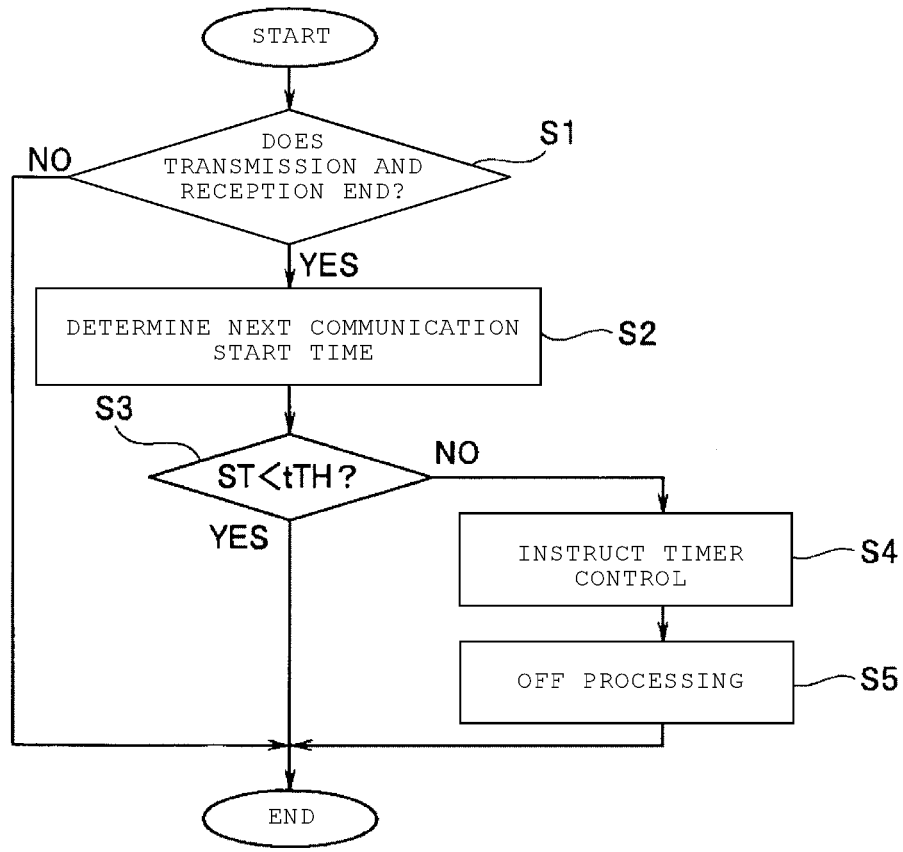
FIG. 4 is a flowchart illustrating an example of a flow of off control processing of power saving control according to the present embodiment.

FIG. 4 is a flowchart illustrating an example of a flow of off control processing of power saving control.

If transmission and reception of data is completed, the control block 22 of the communication device 12 stops supplying power to the entire hardware circuit or a partial hardware circuit of the communication block 23, and controls the communication block 23 to enter a non-operation state so as to save power. In addition, if a time when transmission and reception of data is needed is reached, the control block 22 again starts supplying power to the entire hardware circuit or a partial hardware circuit of the communication block 23, and controls the communication block 23 to enter an operation state.

In addition, the control block 22 has two event states in which transmission and reception of data are performed. One event state indicates the afore-mentioned advertising event, and is a state in which an advertising packet is transmitted in a constant cycle. The other event state is a state of a connection event in which transmission and reception of data are performed. In addition to the event states, power is supplied to a hardware circuit, which requires the power, in the communication block 23, during the scan processing or the initiation processing for receiving the advertising packet AD, and the communication block 23 enters an operation state.

The connection event is a time period in which communication processing with a communication apparatus with which the communication connection is established is performed.

The control block 22 supplies power to a hardware circuit, which requires the power, in the communication block 23 which causes the hardware circuit enter an on state, that is, an operation state, before starting transmission and reception of data. In addition, if the power supply to the hardware circuit, which requires the power, in the communication block 23 has started, the control block 22 performs the off control processing of the power saving control in FIG. 4.

First, the control block 22 determines whether or not transmission and reception of data have been completed, i.e., does transmission and reception end? (step (hereinafter, referred to as S that is short for step) 1).

End of transmission and reception is determined based on whether or not, after communication with another communication apparatus has started, transmission and reception of data to and from a communication device of a partner of the communication has ended.

If the transmission and reception end (S1: YES), the control block 22 performs a determine next communication start time (S2) step. If the transmission and reception does not end (S1: NO), no processing is performed.

A connection event which is performed the most quickly, i.e., the next communication event that will occur, is selected as next communication start time, among all of the connection events with each communication device which is now in connection with.

If advertisement processing, initiation processing, or scan processing is being performed, the control block 22 can also select the operation prior to the connection event.

The control block 22 determines whether or not the time ST until the selected transmission starts is less than predetermined time tTH (S3).

If the time ST is less than the predetermined time tTH (S3: YES), no processing is performed to change the power supplying status.

This case means that the stopping of power supply to a partial circuit for purposes of power saving is not performed, since next transmission and reception start immediately, that is, the next transmission and reception start within the predetermined time tTH.

If the time ST is greater than or equal to the predetermined time tTH (S3: NO), the control block 22 outputs instruction of timer control (S4). The timer control is a process of starting a timer by setting the time until a next connection event in a hardware timer, so as to make the communication device 12 stop processing until next communication processing needs to be performed, to save power.

Then, the control block 22 performs off processing for stopping the supply of power to a predetermined circuit so as to save power (S5).

By performing off control for saving power as described above, power in each communication device is saved.

Subsequently, a case where the communication apparatus 1, which is the master, newly establishes a communication connection with the communication apparatus 3 when the communication apparatus 1 and the communication apparatus 2 have an already established communication connection, will be described.

As will be described below, the communication apparatus 1, which is the master, controls the start of the communication connection such that a communication start timing of a new communication connection between the communication apparatus 1 and the communication apparatus 3 is set at time close to time when communication that uses an existing communication connection between the communication apparatus 1 and the communication apparatus 2 ends.

Figure 5:
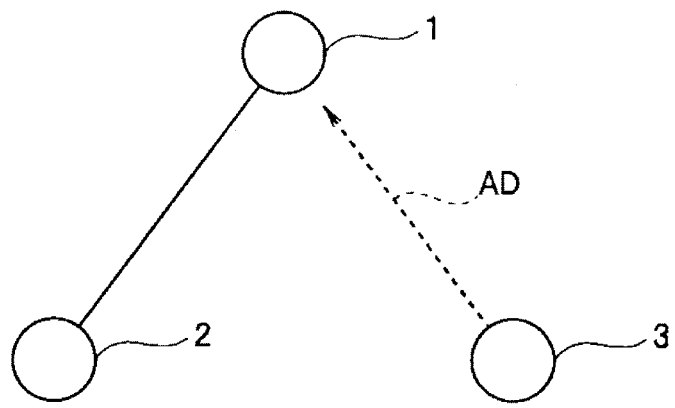
FIG. 5 is a diagram illustrating a state before a communication connection between the communication apparatuses is newly established, according to the present embodiment.

FIG. 5 is a diagram illustrating a state before a new communication connection between the communication apparatuses is established.

As denoted by a solid line in FIG. 5, the communication connection between the communication apparatus 1 and the communication apparatus 2 is already established. The communication apparatus 3 transmits the advertising packet AD to the communication apparatus 1 as denoted by a dotted line so as to establish a communication connection between the communication apparatus 1 and the communication apparatus 3.

Figure 6:
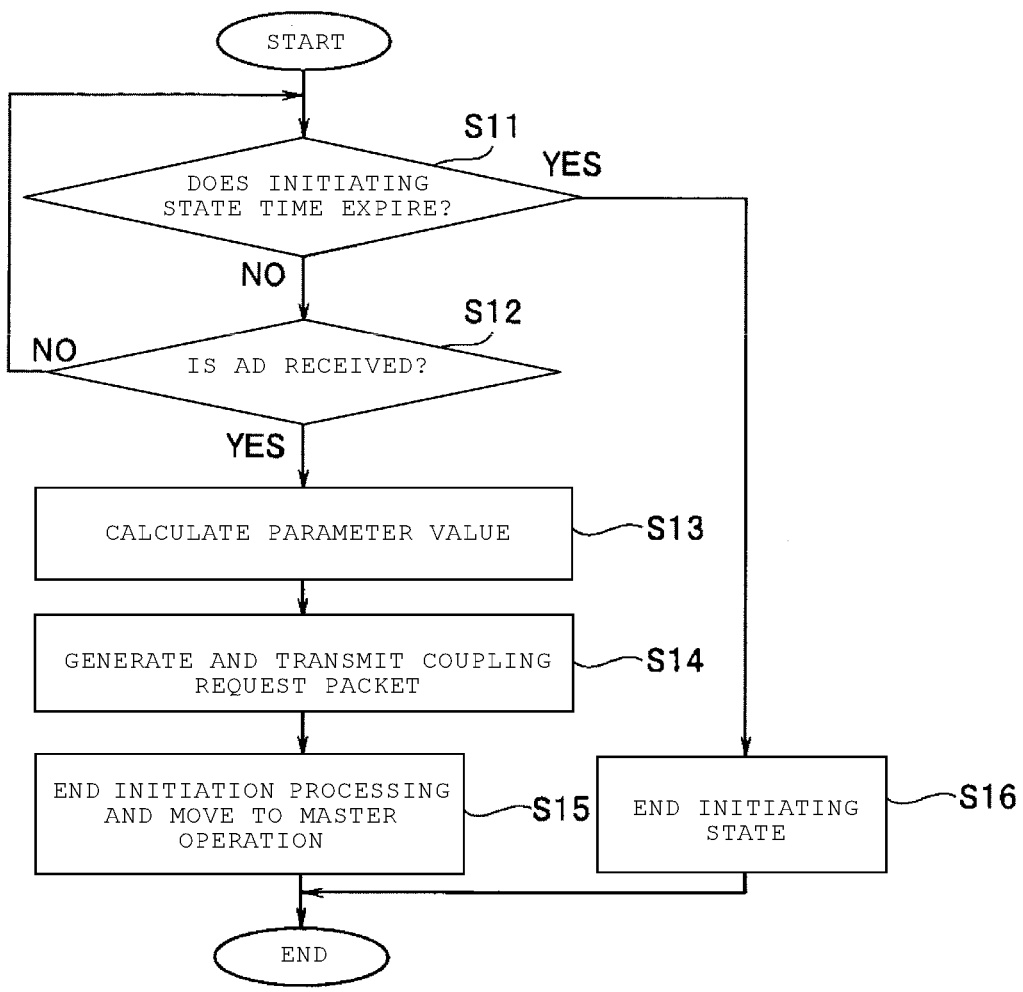
FIG. 6 is a flowchart illustrating an example of a flow of establishment processing of a communication connection in an initiating state, when communication with a certain communication apparatus has been already established, according to the present embodiment.
Figure 7:
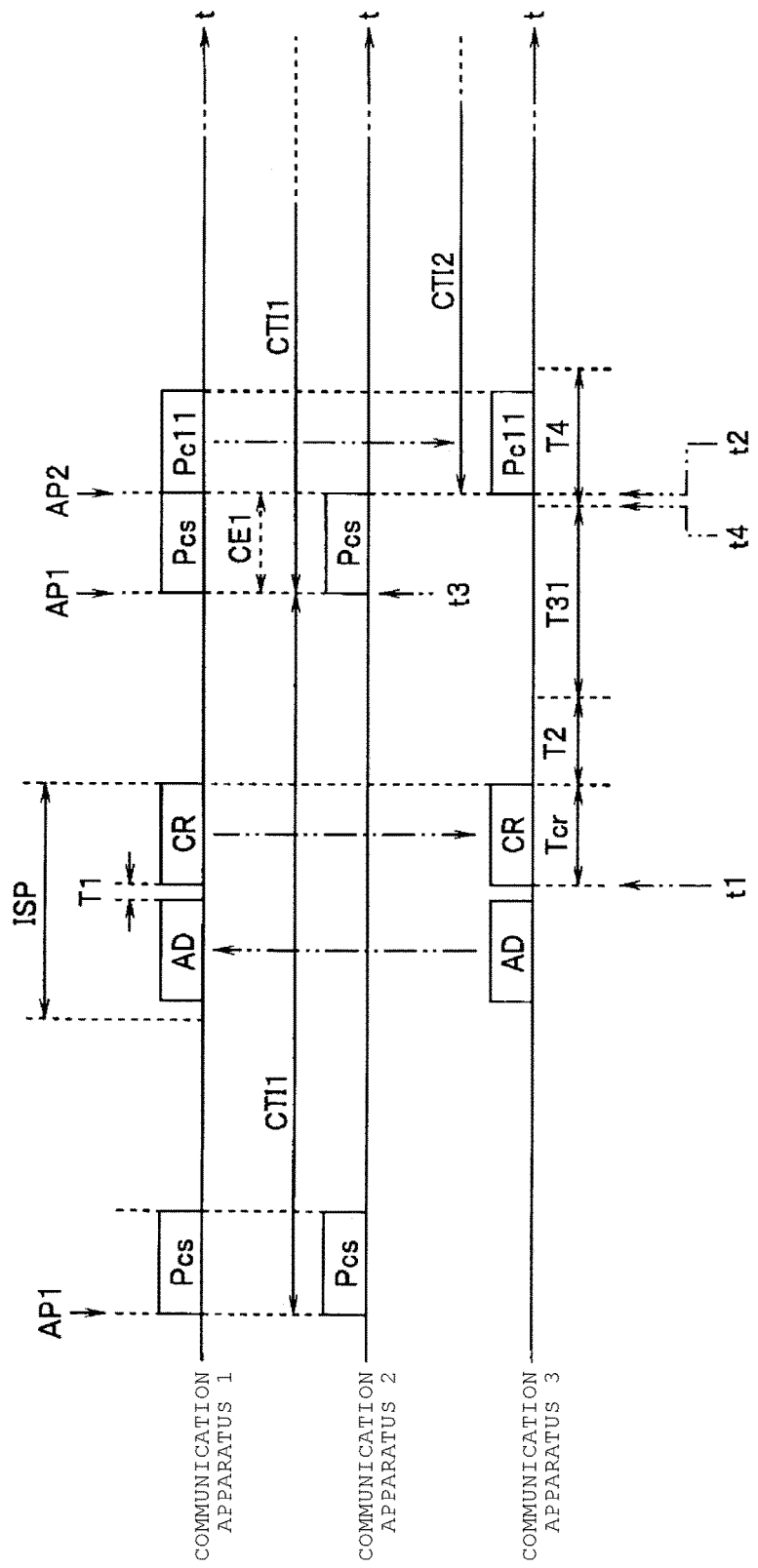
FIG. 7 is a timing chart illustrating transmission and reception of data for establishing a communication connection between a communication apparatus which is a master and a second communication apparatus, according to the present embodiment.

FIG. 6 is a flowchart illustrating an example of a flow of a communication connection establishment processing in an initiating state, when communication with a first communication apparatus is already established. Processing in FIG. 6 is included in a communication connection establishment processing program 24b. FIG. 7 is a timing chart illustrating transmission and reception of data for establishing a communication connection between a communication apparatus, which is the master, and a second communication apparatus. FIG. 7 illustrates a sequence in which a communication connection between the communication apparatus 1 and the communication apparatus 3 is established according to the BLE standard, when the communication connection between the communication apparatus 1 and the communication apparatus 2 is already established according to the BLE standard.

The communication apparatus 1 determines whether or not the initiating state period ISP expires after entering the initiating state when the communication apparatus 1 operates as a master between the communication apparatus 1 and the communication apparatus 2 (S11).

When the initiating state period ISP does not expire (S11: NO), the communication apparatus 1 determines whether or not the advertising packet AD is received (S12).

If the advertising packet AD is not received (S12: NO), processing returns to S11.

When the advertising packet AD is received (S12: YES), the communication apparatus 1 calculates a parameter value, here, a value relating to a predetermined period T31 (S13).

If the communication connection described with reference to FIG. 3 is established for the first time with a communication apparatus, the predetermined period T3 which is a transmission window offset period may be a constant value. However, since a communication connection with communication apparatus 2 is already established, a period of transmission and reception of data to and from the communication apparatus 3 with which coupling is being newly established may not overlap a period of transmission and reception of data to and from the communication apparatus 2, and the communication apparatus 1 calculates and sets the predetermined time period T31, which is the transmission window offset period for the communication apparatus 3, such that transmission and reception to and from the communication apparatus 3 occur subsequent to the transmission and reception to and from the communication apparatus 2 are performed.

Transmission and reception of a packet data Pcs are performed between the communication apparatus 1 and the communication apparatus 2 within a connection event length CE1 defined by the master. Hence, the communication device 12 of the communication apparatus 1 that is the master can calculate end time of a connection event of communication with the communication apparatus 2. Then, the predetermined period T31 is set such that start time of communication with the communication apparatus 3 coincides or approximately coincides with end time of the connection event with the communication apparatus 2.

Specifically, the control block 22 of the communication device 12 of the communication apparatus 1 calculates a parameter value Tp relating to the predetermined period T31 by using following Equation (1).

$$Tp=(t2-t1-T2-Tcr-\alpha)/T2 \quad (1)$$

Here, t1 indicates transmission time of the coupling request packet CR, and t2 indicates the end time of a connection event of the communication apparatus 2. Hence, the parameter value Tp is a value relating to a transmission window offset (transmitWindowOffset) period in the coupling request packet CR.

The time t2 is the end time of the connection event of the communication apparatus 2 which is generated after the coupling request packet CR is transmitted, as illustrated in FIG. 7. The communication device 12 of the communication apparatus 1 which has received the advertising packet AD may set time t2 at a time obtained by adding a period of the connection event length CE1 to communication start time t3 when next communication can be made in the existing communication connection with the communication apparatus 2.

As described above, the predetermined period T2 is 1.25 ms defined by the BLE standard. The time Tcr is transmission time of the coupling request packet CR. As described above, time $\alpha$ is margin time which is taken until a first packet is transmitted, after the predetermined period T31 that is the transmission window offset period.

As described above, the communication device 12 sets information of a value which is obtained by subtracting the transmission time Tcr of the coupling request packet CR, the period T2, and the time $\alpha$ from a time difference between the time t1 when the coupling request packet CR is transmitted and the end time t2 of the connection event of the existing communication connection, to information of the predetermined period T31 that is the transmission window offset (transmitWindowOffset) period. Here, a value of the aforementioned Equation (1) is used as the parameter value Tp relating to the predetermined period T31.

When the parameter value Tp includes a decimal point, the parameter value is rounded up or rounded down, thereby, being an integer value.

The communication device 12 of the communication apparatus 1 also determines a coupling interval CTI2 that is a communication interval with the communication apparatus 3.

As described above, the communication apparatus 1 generates the coupling request packet CR which includes information of the predetermined periods T31 and T4 and information of the coupling interval CTI2, and transmits the packet to the communication apparatus 3.

That is, the coupling request packet CR that is a coupling request signal includes information of the coupling interval CTI2 for communication with the second communication device 3 as a predetermined interval, and information of the reception window period T4 in which the second communication device 3 receives the coupling request packet CR, in addition to the information of the parameter value Tp.

The information on the predetermined period T31 corresponding to the predetermined period T3 is included in the coupling request packet CR as the parameter value Tp that is calculated by Equation (1).

The information of the predetermined period T4 which is included in the coupling request packet CR may be a fixed value and may be a value according to the communication apparatus 3.

The information of the coupling interval CTI2 which is included in the coupling request packet CR may have the same value as the coupling interval CTI1, and may be a value according to the communication apparatus 3.

The communication apparatus 1 generates the coupling request packet CR by using the calculated parameter value, and transmits the packet (S14).

If the coupling request packet CR is received by the communication apparatus 3, the communication device 12 of the communication apparatus 3 opens a reception window only during the period T4 of the transmission window (transmitWindow) period which starts from time t4 that is determined based on the parameter value Tp, and thus enters a state where a first packet Pc11 can be received.

If the coupling request packet CR is transmitted, the communication apparatus 1 ends the initiation processing, and returns to master operation (S15).

In addition, when the initiating state period ISP expires (S11: YES), the communication apparatus 1 ends the initiating state (S16).

As illustrated in FIG. 7, the predetermined period T31 is calculated such that end of the predetermined period T31 is close to the end time t2 of the connection event of the communication apparatus 2 in which communication has been already established. If the coupling request packet CR is received, the communication apparatus 3 sets the predetermined period T31 that is the reception window offset period using the plurality of parameter values Tp which are included in the coupling request packet CR, and sets the predetermined period T4 that is the reception window period.

That is, when communication with the first communication device 2 has been already established at the first coupling interval CTI1, if the advertising packet AD as a predetermined signal is received from the second communication device 3, the control block 22 as a communication control unit calculates the time until the communication start timing t2 in which the communication start timing t2 when first communication with the second communication device 3 starts is immediately after the communication end timing t2 when communication with the first communication device 2 ends, and transmits the coupling request packet CR including parameter information providing the time until the calculated communication start timing t2 so as to establish communication with the second communication device 3.

The time difference between the communication start timing, when the communication with the communication device 3 starts, and the communication end timing t2, when the communication with the communication device 2 ends, is less than the predetermined time tTH that is used for the afore-mentioned power saving control.

As a result, the start time t4 of the predetermined period T4 that is the reception window period in which the communication apparatus 3 receives the first packet which is transmitted from the communication apparatus 1 is set to a time prior to the end time t2 of the connection event of the communication apparatus 2 by the addition of the time period a, and the first packet Pc11 can be received during the predetermined period T4, as illustrated in FIG. 7.

That is, the time period until the communication start timing t2 is calculated based on the time t1 when the coupling request packet CR starts to be transmitted to the communication device 3 herein. In addition, the time until the communication start timing t2 when the communication with the communication device 3 starts is a time where the communication end timing when the communication with the communication device 2 ends coincides or approximately coincides with the communication start timing when the first communication with the communication device 3 starts.

As described above, the control block 22 includes a CPU and the memory 24, the CPU executes a program that is stored in the memory 24 and calculates the time until the communication start timing t2, and thereby, the time until the communication start timing t2 is calculated.

Communication between the communication apparatus 1 that is a master, and the communication apparatus 3 that is a slave, is also performed in each connection event, and the connection event length is defined by the master. Hence, if communication start time is begun, the communication apparatus 3 that is a slave is allowed to communicate with the master only during a period of the connection event length.

Figure 8:
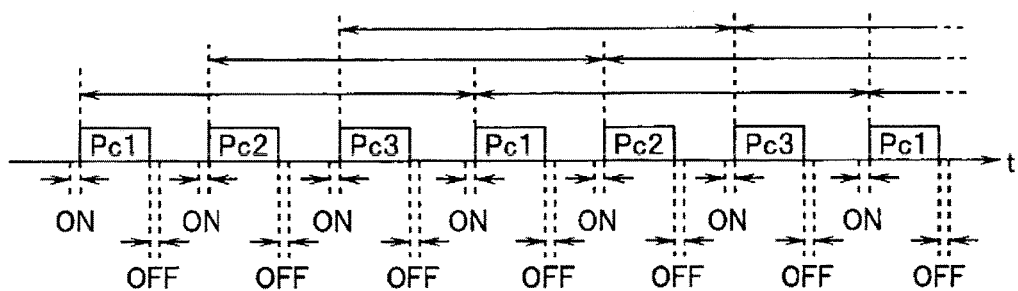
FIG. 8 is a time chart illustrating an example of timing of transmission and reception between a plurality of communication apparatuses of the related art.

FIG. 8 is a time chart illustrating an example of timing of transmission and reception between a plurality of communication apparatuses of the related art.

FIG. 8 illustrates timing when the communication apparatus which becomes a master performs communication with three slaves. The master performs transmission and reception of the first packet Pc1 by activating (initiating and supplying of power to) hardware relating to the communication before the transmission and reception of the first packet Pc1 to and from the first slave is performed, and deactivating (turning the power supply off to) the hardware relating to the communication after the transmission and reception ends.

Thereafter, the master performs transmission and reception of the packet Pc2 by activating hardware relating to the communication before the transmission and reception of the packet Pc2 to and from the second slave is performed, and deactivating the hardware relating to the communication after the transmission and reception ends.

Thereafter, the master performs transmission and reception of a packet Pc3 by activating hardware relating to the communication before the transmission and reception of the packet Pc3 to and from the third slave is performed, and deactivating the hardware relating to the communication after the transmission and reception ends.

Hence, the master frequently performs activation and deactivation, and thus powering on and powering off, of the hardware relating to the communication, as illustrated in FIG. 8.

Figure 9:
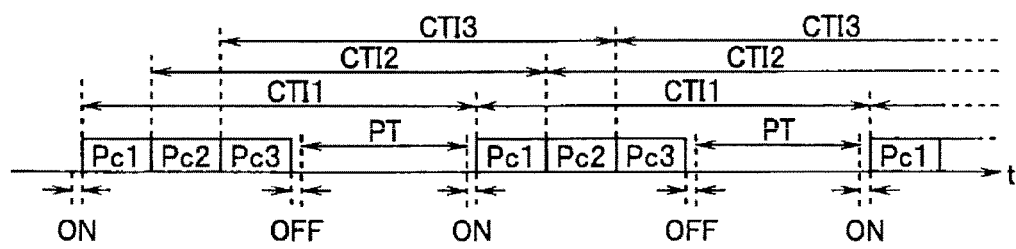
FIG. 9 is a time chart illustrating an example of timing of transmission and reception between a plurality of communication apparatuses, according to the present embodiment.

FIG. 9 is a time chart illustrating an example of timing of transmission and reception between the same number of a plurality of communication apparatuses, according to the present embodiment.

FIG. 9 also illustrates the timing when the communication apparatus, which is a master, performs communication with three slaves. When communication with the second slave is established after communication with the first slave is established, the master sets a communication start position (Anchor Point) with the second slave as the time when transmission and reception of the first packet Pc1 to and from the first slave ends.

Furthermore, when communication with the third slave is established after the communication with the first slave and the second slave is established, the master sets a communication start position (Anchor Point) with the third slave as the time when transmission and reception of the packet Pc2 to and from the second slave end.

That is, a communication apparatus which operates as a master defines communication connection information on the communication start time, such that the communication start positions (Anchor Points) of the respective communication apparatuses are closely spaced in time when communication connection is established between the plurality of communication apparatuses.

As a result, the communication start positions of the plurality of communication connections are closely spaced in time as illustrated in FIG. 9, such that the ending of a first communication window with a first apparatus and the beginning of the communication window with a second apparatus coincide, or slightly overlap, and the ending of the second communication window with the second apparatus and the beginning of the communication window with a third apparatus coincide, or slightly overlap. Thus, the time ST until the transmission time (transmission window) of the next transmission and reception of data illustrated in FIG. 4 for the subsequently connected slave to the master is less than the predetermined time tTH which is used for power saving control.

In other words, the master sets a communication start position (Anchor Point) with a new slave, such that the communication start position (Anchor Point) with the new slave is positioned within the predetermined time tTH from an end point of time of transmission and reception of a packet to and from another slave with which communication connection has been already established, when the master establishes communication with the new slave.

Hence, the communication start positions of the plurality of communication connections are clustered together as illustrated in FIG. 9. Thus, the duration of the time during periods where communication is not intended to occur increases, and the execution of processing of ON/OFF switching of the communication apparatus correspondingly decreases. As a result, power consumption can be reduced.

Hence, in the master, the number of times of powering ON and OFF the hardware relating to communication is reduced and a pause period PT increases, as illustrated in FIG. 9, as compared with FIG. 8. Thus, the master further saves power.

As described above, according to the afore-mentioned embodiments, it is possible to provide a communication apparatus and a communication method which establish communication connection with a plurality of communication apparatuses such that the number of stops and starts of supply of power for reducing power consumption in the communication apparatus is reduced.

Each "unit" in the present disclosure is a conceptual member corresponding to each function of the embodiment, and the unit does not necessarily correspond one-to-one to specific hardware or a software routine. Hence, in the preset disclosure, the embodiments are hereinafter described by assuming a virtual circuit block (unit) with each function of the embodiment. In addition, in each step of each sequence of steps in the present embodiment, the execution sequence of the steps may be changed, a plurality of steps may be simultaneously executed, or each step may be executed in a different sequence, unless that is contrary to the properties thereof. Furthermore, the entirety of, or a part of, each step of each sequence of the present embodiment may be executed by hardware.

The entirety or a part of a program which performs the afore-mentioned operations is recorded or stored in a portable medium such as a flexible disk or a CD-ROM, or a non-transitory computer readable medium such as a hard disk, as a program product for a computer. The program is read by a computer, and an entirety or a part of an operation is performed thereby. Alternatively, an entirety or a part of the program can be distributed or provided through a communication network. A user installs the program into a computer by downloading the program through the communication network, or installs the program into the computer from a recording medium, whereby the communication device and the communication method according to the present embodiment can be easily achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A first communication device that performs wireless communication with at least a second communication device and a third communication device, comprising:
  a communication control unit that, when the first communication device is in communication with the second communication device, and receives a request to communicate with the third communication device from the third communication device:
    determines the time period during which communication between the first communication device and the second communication device can occur;
    calculates a time period when a communication between the first communication device and the second communication device could interfere with a communication between the first communication device and the third communication device;
    sets, as the beginning of a time period during which communication between the first communication device and the third communication device can occur, a time where the transmission or receipt of a communication between the first communication device and the third communication device will not interfere with a communication between the first communication device and the second communication device; and
    transmits a coupling request signal including information concerning the time until the beginning of the time period during which communication between the first communication device and the third communication device begins so as to establish communication with the second communication device.

2. The first communication device according to claim 1, wherein the beginning of the time period during which communication between the first communication device and the third communication device can occur coincides with the time when the communication period for communication between the first and the second communication device ends.

3. The first communication device according to claim 1, wherein the beginning of the time period during which communication between the first communication device and the third communication device can occur is determined based on when transmission of the coupling request signal to the second communication device will begin.

4. The first communication device according to claim 1, wherein:
  the communication control unit comprises a central processing unit and a memory, and
  the central processing unit calculates the beginning of the time period during which communication between the first communication device and the third communication device can occur by executing a program for calculating the beginning of a time period during which communication between the first communication device and the third communication device can occur that is stored in the memory.

5. The first communication device according to claim 1, wherein the coupling request signal includes information concerning the duration of the time period during which communication between the first communication device and the third communication device can occur.

6. The first communication device according to claim 1, wherein the beginning of the time period during which communication between the first communication device and the third communication device can occur is calculated, by the control unit, as a fixed time, plus an integer multiple of the fixed time, after the coupling request signal is sent by the first communication device.

7. The first communication device according to claim 1, wherein the beginning of the time period during which communication between the first communication device and the third communication device can occur is calculated, by the control unit, as a fixed time, plus an integer multiple of the fixed time, beginning after the coupling request signal is sent by the first communication device, plus a margin time period.

8. The first communication device according to claim 1, further comprising:
a circuit for wireless communication; and
a power supply control unit configured to stop supplying power to the circuit for wireless communication, when wireless communication is not performed for a predetermined period of time or longer,
wherein the time difference between the end of the time period during which communication between the first communication device and the second communication device can occur, and the beginning of the time period during which communication between the first communication device and the third communication device can occur, is less than the predetermined period of time.

9. The first communication device according to claim 1, wherein the predetermined signal is an advertising packet which is defined by a wireless communication standard.

10. The first communication device according to claim 9, wherein the communication control unit performs initiation processing for receiving an advertising packet in a predetermined cycle.

11. A communication method for performing wireless communication by a first communication device, comprising:
receiving, within a first, predetermined, interval a signal from a third communication device when communication between the first communication device and a second communication device is already established;
calculating a time until communication between the first communication device and the third communication device can begin, the calculated time being immediately after communication between the first communication device and a second communication device ends; and
transmitting a coupling request signal including the information of the time when communication between the first communication device and the third communication device can occur so as to establish the communication with the third communication device.

12. The communication method according to claim 11, further comprising:
calculating the earliest time that communication between the first communication device and the third communication device can start as a fixed time period plus an integer multiple of the fixed time interval after the coupling request was sent by the first communication device.

13. The communication method according to claim 12, wherein the period of time between the end of the period of time during which the first communication device and the second communication device can communicate, and the beginning of the period of time when the first communication device and the third communication device can communicate, is less than the fixed time period.

14. The communication method according to claim 11, further comprising transmitting, as a part of the coupling request signal, the period of time during which the first communication device and the third communication device can communicate.

15. The communication method according to claim 11, further comprising:
calculating the earliest time that communication between the first communication device and the third communication device can start as a fixed time period, plus an integer multiple of the fixed time interval, plus a margin time period, wherein the margin time is less than the fixed time period.

16. The communication method according to claim 14, wherein the period of time during which the first communication device and third communication device can communicate is greater than the period of time required for one of the first and the third communication devices to receive a packet as a signal and transmit a packet as a signal.

17. The communication method according to claim 11, wherein the predetermined signal is an advertising packet which is defined by a wireless communication standard.

18. A first communication device that performs wireless communication with at least a second communication device and a third communication device, comprising:
a communication control unit that, when the first communication device is in communication with the second communication device, and receives a request to communicate with the third communication device from the third communication device:
determines the time period during which communication between the first communication device and the second communication device can occur;
sets, as the beginning of a time period during which communication between the first communication device and the third communication device can occur, a time no sooner than the time period during which communication between the first communication device and the second communication device can occur ends; and
transmits a coupling request signal including information concerning the time until the beginning of the time period during which communication between the first communication device and the third communication device begins so as to establish communication with the second communication device.

19. The first communication device according to claim 18, wherein the communication control unit calculates the period of time when communication between the first communication device and the third communication device can occur as the sum of a fixed time period plus an integer multiple of the fixed time period.

20. The first communication device according to claim 19, further comprising:
a circuit for wireless communication; and
a power supply control unit configured to stop supplying power to the circuit for wireless communication, when wireless communication is not performed for predetermined period of time or longer,
wherein the time difference between the end of the time period during which communication between the first communication device and the second communication device can occur, and the beginning of the time period during which communication between the first communication device and the third communication device can occur, is less than a predetermined time.

* * * * *